United States Patent [19]

Song

[11] Patent Number: 5,379,076
[45] Date of Patent: Jan. 3, 1995

[54] VIDEO MOTION COMPENSATION CIRCUIT

[75] Inventor: Ki H. Song, Seoul, Rep. of Korea

[73] Assignee: Goldstar Co., Ltd., Seoul, Rep. of Korea

[21] Appl. No.: 117,424

[22] Filed: Sep. 7, 1993

[30] Foreign Application Priority Data

Sep. 7, 1992 [KR] Rep. of Korea ............... 16324/1992

[51] Int. Cl.$^6$ .............................................. H04N 1/41
[52] U.S. Cl. ..................................... 348/699; 348/402; 348/407; 348/413; 348/416
[58] Field of Search ............... 348/402, 407, 413, 416, 348/699

[56] References Cited

U.S. PATENT DOCUMENTS

| | | | |
|---|---|---|---|
| 4,661,846 | 4/1987 | Kondo | 348/416 |
| 4,862,260 | 7/1989 | Harradine et al. | 348/416 |
| 5,040,061 | 8/1991 | Yonemitsu | 358/135 |
| 5,049,991 | 9/1991 | Niihara | 348/416 |

FOREIGN PATENT DOCUMENTS

0424269A1 10/1990 European Pat. Off. ....... H04N 7/00
PCT/GB87/-
00923 12/1987 United Kingdom ........ H04N 5/907

Primary Examiner—Tommy P. Chin
Assistant Examiner—Emil P. Lenchak
Attorney, Agent, or Firm—Fliesler, Dubb, Meyer & Lovejoy

[57] ABSTRACT

A video motion compensation circuit comprising a Y phase variation compensation section for inputting a macro slice address signal and a motion vector Y signal and compensating for a variation in a phase of the motion vector Y signal and a X phase variation compensation section for inputting a macro block address signal and a motion vector X signal and compensating for a variation in a phase of the motion vector X signal. The X phase variation compensation section includes four logic circuits, each having a 2-bit shifter for inputting the macro block address signal of 7 bits and outputting a 9-bit signal, a logic adder for logically combining low order 2 bits of the motion vector X signal of 5 bits to previously add 1 to a LSB of the macro block address signal, and a complement operation unit/shifter for taking a 2's complement of the motion vector X signal of 5 bits and increasing a MSB of the 2's complement-operated signal to output a 9-bit signal. The Y phase variation compensation section includes a 4-bit shifter for inputting the macro slide address signal of 6 bits and outputting a 10-bit signal and a complement operation unit/shifter for taking a 2's complement of the motion vector Y signal of 5 bits and increasing a MSB of the 2's complement-operated signal to output a 10-bit signal.

8 Claims, 7 Drawing Sheets

VIDEO MOTION COMPENSATION CIRCUIT

BACKGROUND OF THE INVENTION

1. Field of the Invention

The present invention relates in general to a video motion compensation circuit for a high definition television (HDTV), and more particularly to a video motion compensation circuit which is capable of compensating simply for video data by a detected amount of video motion and real time-processing a large amount of video data.

2. Description of the Prior Art

A video motion compensation technique is to reduce an amount of video data using a video motion vector detected at an encoder stage, for reproduction of a video signal with a better picture quality.

A conventional video motion compensation circuit used in such a video motion compensation technique is shown in a block form in FIG. 1. As shown in this drawing, the conventional video motion compensation circuit comprises a frame memory address generator 1, an address controller 2, frame memories 3 and 3', an adder 5, a data input/output (I/O) controller 4 and a clock generator/counter 6.

In operation, the address generator 1 generates an address signal to one of the frame memories 3 and 3' to be read, in response to video motion vector X and Y signals from an encoder section (not shown) and a position signal regarding a basic block. The address controller 2 addresses one of the frame memories 3 and 3' in response to the address signal from the address generator 1. The data I/O controller 4 controls data input and output of the addressed one of the frame memories 3 and 3'. At this time, the counter 6 is controlled based on a size of the basic block to vary the address signal of the address generator 1 by an amount of video motion. The addressed one of the frame memories 3 and 3' is sequentially accessed pixel by pixel and the resultant data therefrom is added to decoded reproduction video data IT in the adder 5. Then, the added data from the adder 5 is stored in the other frame memory 3 or 3' under the control of the data input/output controller 4. An address to one of the frame memories 3 and 3' to be written can be generated on the basis of only a predetermined block position.

The above-mentioned conventional video motion compensation circuit has no problem in theory; however, it has a practical problem of requiring a system of clock of 60 MHz or more in a system hardware to real time-process a large amount of video data since the large amount of video data is processed in the unit of pixel. Namely, the use of such a high frequency system clock makes the selection of components difficult, makes the system instable and results in a limit to an availability of a clock frequency provided by an erasable programmable logic device (EPLD) being widely used now. The limit to the availability of the clock frequency restricts the use of the EPLD.

SUMMARY OF THE INVENTION

Therefore, the present invention has been made in view of the above problems, and it is an object of the present invention to provide a video motion compensation circuit with a two-dimensional, four-phase frame memory section in which vide data of one frame is divided into four equal parts in a X axis direction and the four equal parts of the vide data are stored in four memories of the four-phase frame memory section so that the real time process of the video data can be performed on the basis of a ¼ system clock and the prior problems resulting from a high frequency system clock can thus be solved.

It is another object of the present invention to provide a video motion compensation circuit with a two-dimensional, four-phase frame memory in which video data is partitioned according to a X axis macro block address (MBA) signal and a Y axis macro slice address (MSA) signal so that the video data can be compensated for by a detected amount of video motion for accurate reproduction of a video signal.

In accordance with the present invention, the above and other objects can be accomplished by a provision of a video motion compensation circuit comprising Y phase variation compensation means for inputting a macro slice address signal and a motion vector Y signal and compensating for a variation in a phase of the motion vector Y signal; first adding means for adding two output signals from said Y phase variation compensation means; first latch means for latching an output signal from said first adding means; first counting means for counting an output signal from said first latch means; X phase variation compensation means for inputting a macro block address signal and a motion vector X signal and compensating for a variation in a phase of the motion vector X signal; second adding means having a plurality of adders for adding a plurality of sets of two output signals from said X phase variation compensation means respectively in the unit of set; second latch means for latching a plurality of output signals from said second adding means respectively; second counting means for counting a plurality of output signals from said second latch means respectively; third latch means for latching the macro slice address signal; third counting means for counting an output signal from said third latch means; fourth latch means for latching the macro block address signal; fourth counting means for counting an output signal from said fourth latch means; storage means for storing output signals from said third and fourth counting means; first and second multiplexing means, each having a first 2:1 multiplexer for 2:1-multiplexing output signals from said first counting means and said storage means and a second 2:1 multiplexer for 2:1-multiplexing each of a plurality of output signals from said second counting means and the output signal from said storage means; first frame memory means for storing a plurality of output signals from said first multiplexing means; second frame memory means for storing a plurality of output signals from said second multiplexing means; read select control means for selecting one of said first and second frame memory means, inputting a plurality of output signals from the selected frame memory means and providing one output signal; third adding means for adding the output signal from said read select control means to decoded reproduction video data and outputting the resultant phase-compensated video data; data write control means for selecting one of said first and second frame memory means and writing the phase-compensated video data from said third adding means into the selected frame memory means; and system clock generating means for generating a system clock pulse.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

Figure 1:
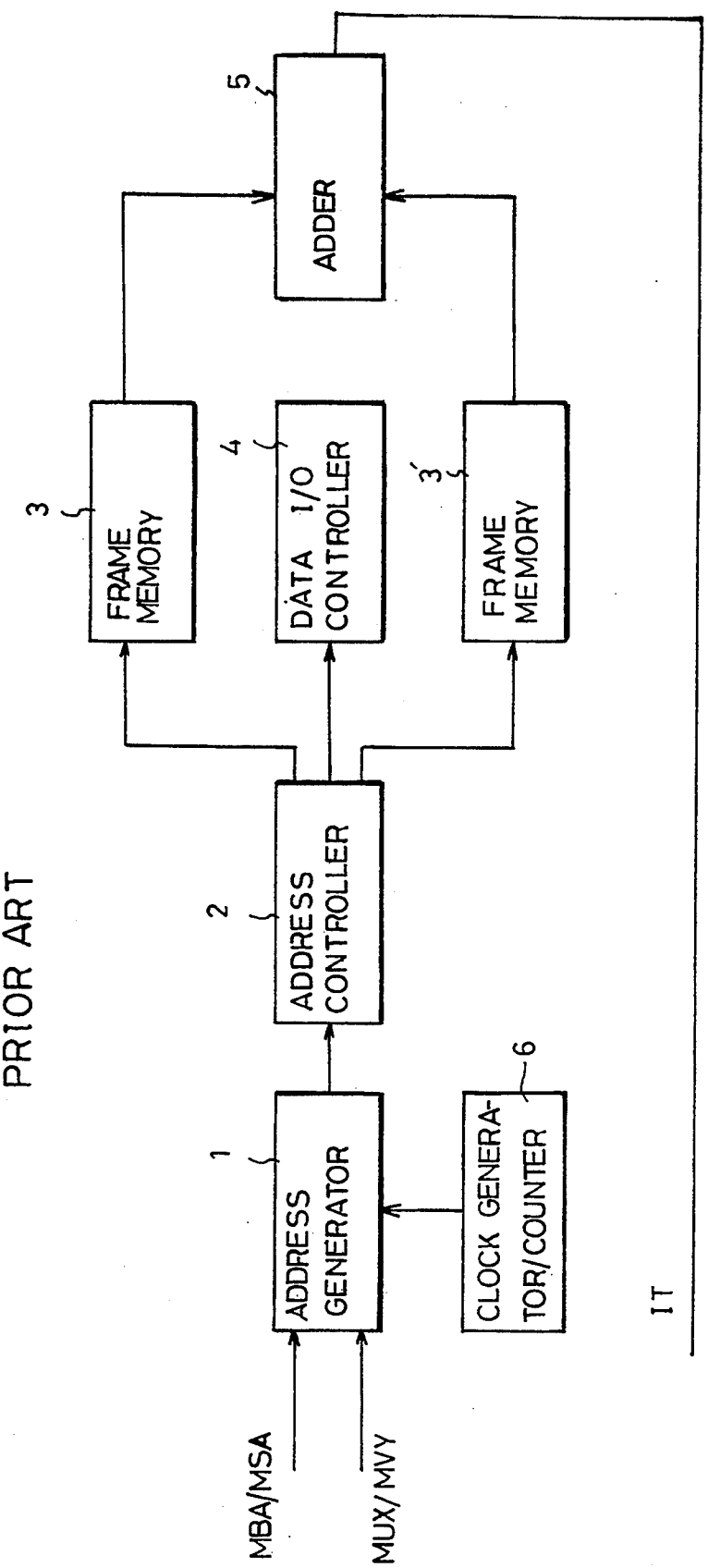
FIG. 1 is a block diagram of a conventional video motion compensation circuit.
Figure 2:
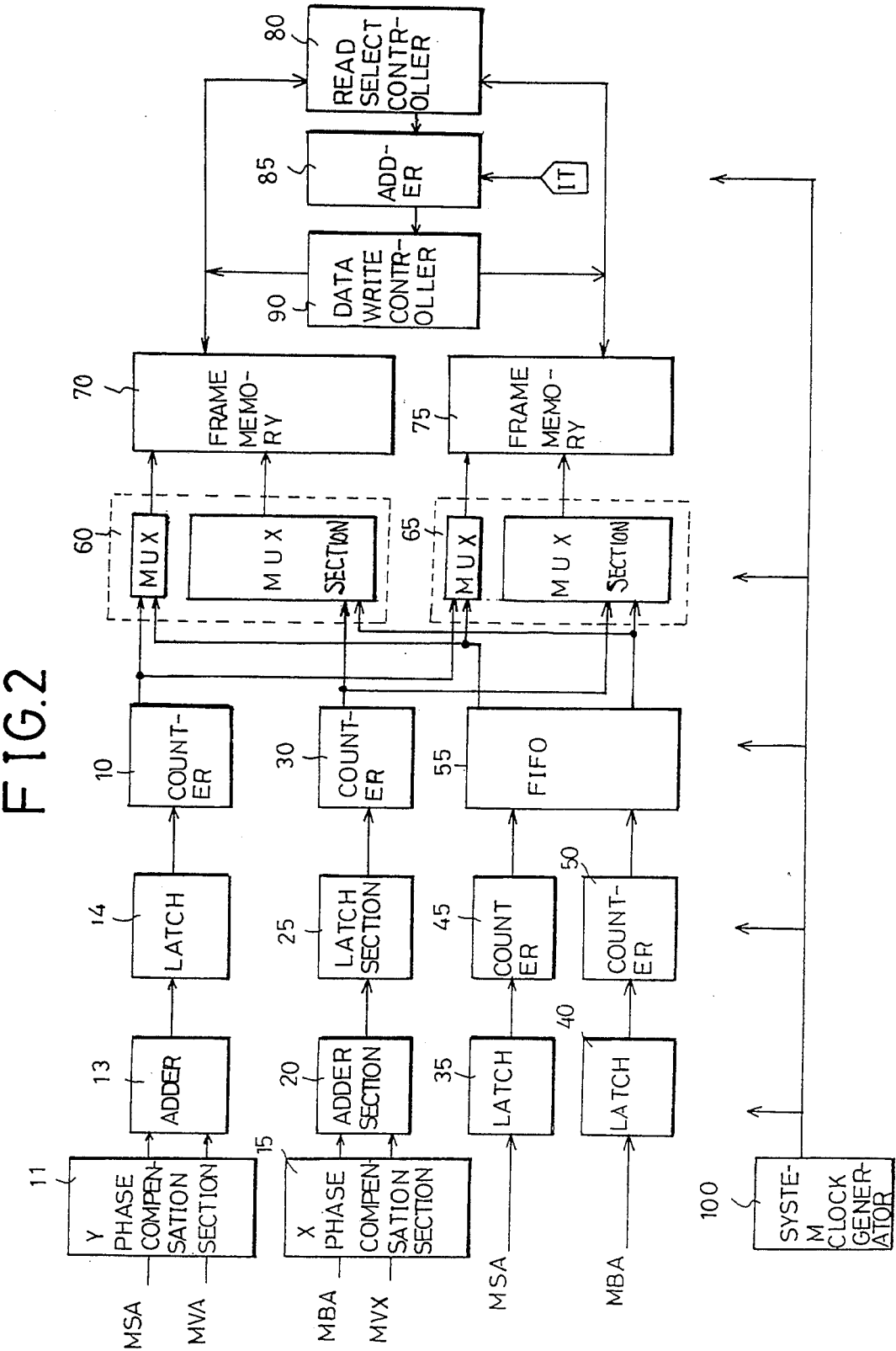
FIG. 2 is a block diagram of a video motion compensation circuit in accordance with the present invention.

Referring to FIG. 2, there is shown a block diagram of a video motion compensation circuit in accordance with the present invention. As shown in this drawing, the video motion compensation circuit comprises a Y phase variation compensation section 11 for inputting a macro slice address signal MSA and a motion vector Y signal MVY and compensating for a variation in a phase of the motion vector Y signal MVY, a 10-bit adder 13 for adding two output signals from the Y phase variation compensation section 11, a latch circuit 14 for latching an output signal from the 10-bit adder 13, and an counter 10 for counting an output signal from the latch circuit 14.

The video motion compensation circuit also comprises a X phase variation compensation section 15 for inputting a macro block address signal MBA and a motion vector X signal MVX and compensating for a variation in a phase of the motion vector X signal MVX, a 9-bit adder section 20 for adding four sets of two output signals from the X phase variation compensation section 15 respectively in the unit of set, a latch circuit section 25 for latching four output signals from the 9-bit adder section 20 respectively, and an counter section 30 for counting four output signals from the latch circuit section 25 respectively.

A latch circuit 35 is provided in the video motion compensation circuit to latch the macro slice address signal MSA. A counter 45 counts an output signal from the latch circuit 35.

A latch circuit 40 is also provided in the video motion compensation circuit to latch the macro block address signal MBA. A counter 50 counts an output signal from the latch circuit 40.

A FIFO memory stores output signals from the counters 45 and 50. Each of multiplexer sections 60 and 65 has a 2:1 multiplexer for 2:1-multiplexing output signals from the counter 10 and the FIFO memory 55 and a 2:1 multiplexer for 2:1-multiplexing each of four output signals from the counter section 30 and the output signal from the FIFO memory 55.

The video motion compensation circuit also comprises a frame memory section 70 with a plurality of parallel 512K×8-byte memories, each for storing a corresponding one of four output signals from the multiplexer 60, a frame memory section 75 with a plurality of parallel 512K×8-bytes memories, each for storing a corresponding one of four output signals from the multiplexer section 65, a read select controller 80 for selecting one of the frame memory sections 70 and 75, inputting four output signals from the selected frame memory section and providing one output signal, an adder 85 for adding the output signal from the read select controller 80 to decoded reproduction video data IT and outputting the resultant phase-compensated video data, a data write controller 90 for selecting one of the frame memory sections 70 and 75 and writing the phase-compensated video data from the adder 85 into the selected frame memory section, and a system clock generator 100 for generating a system clock pulse.

Each of the counters 10 and 45 is a 15 MHz/4 clock counter for counting a corresponding one of the output signals from the latch circuit 14 and 35 at a clock of 15 MHz/4. The counter section 30 has four counters and the latch circuit section 25 has four latch circuits. Each of the counters of the counter section 30 and the counter 50 is a 15 MHz clock counter for counting a corresponding one of the output signals from the latch circuits of the latch circuit section 25 and the latch circuit 40 at a clock of 15 MHz.

Figure 3:
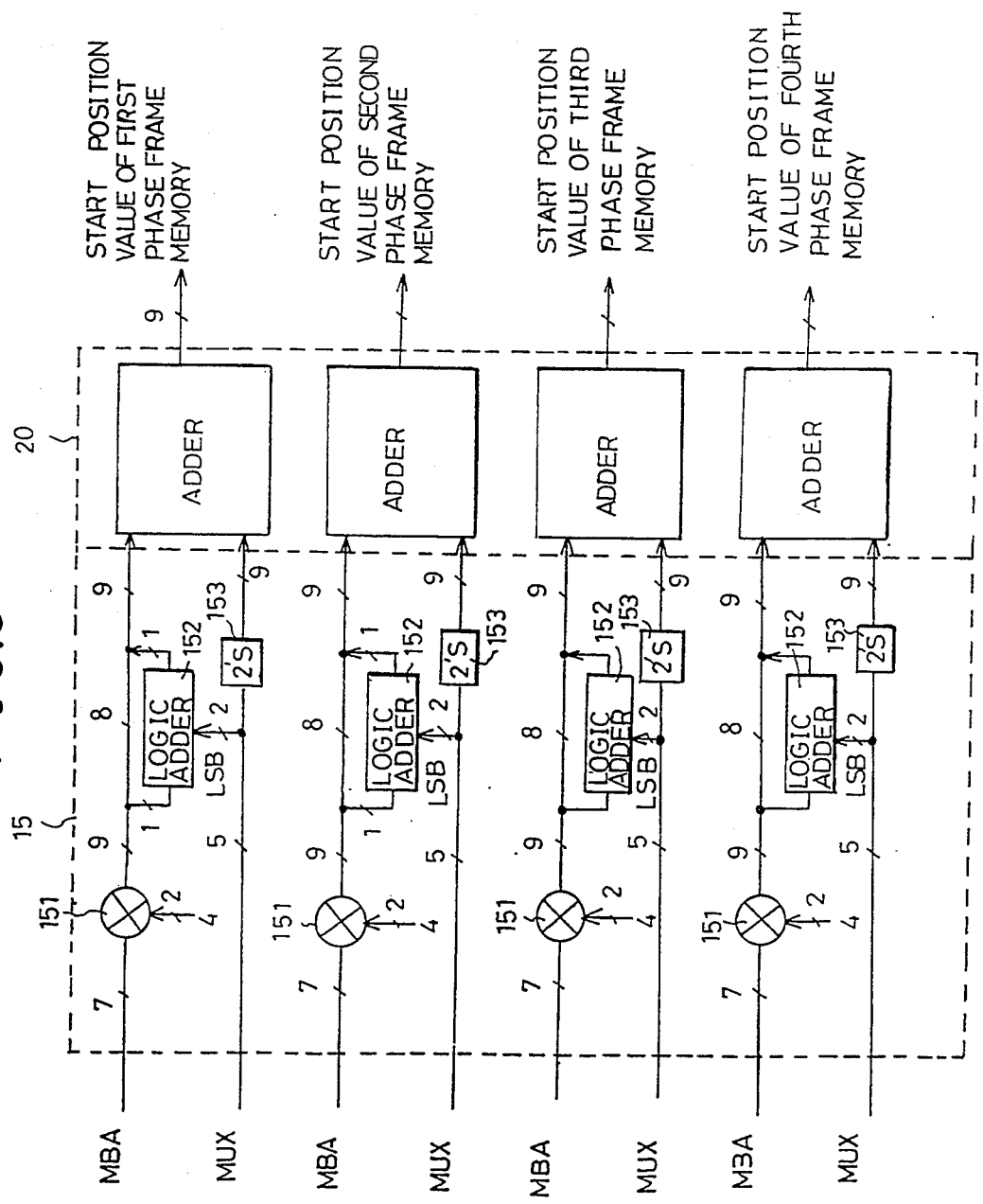
FIG. 3 is a block diagram of a X phase variation compensation section in the circuit in FIG. 2.

Referring to FIG. 3, there is shown a block diagram of the X phase variation compensation section 15 in the circuit in FIG. 2. As shown in this figure, the X phase variation compensation section 15 includes four logic circuits. Each logic circuit includes a 2-bit shifter 151 for inputting the macro block address signal MBA of 7 bits and outputting a 9-bit signal, a logic adder 152 for logically combining low order 2 bits MVX0 and MVX1 of the motion vector X signal MVX of 5 bits to previously add 1 to a least significant bit (LSB) of the macro block address signal MBA, and a complement operation unit/shifter 153 for taking a 2's complement of the motion vector X signal MVX of 5bits and increasing a most significant bit (MSB) of the 2's complement-operated signal to output a 9-bit signal.

Figure 4:
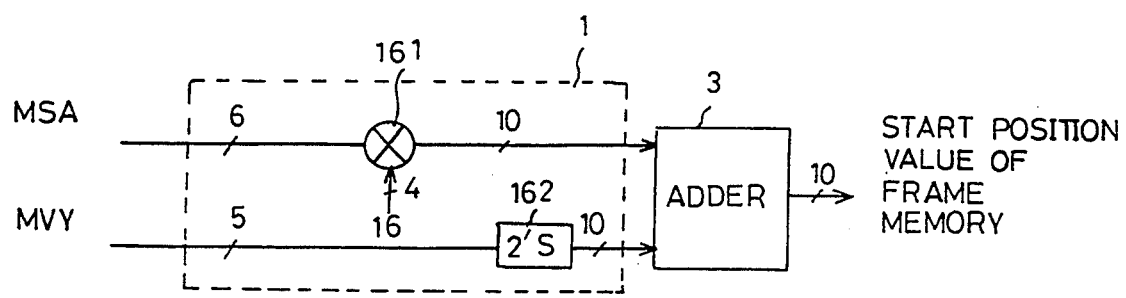
FIG. 4 is a block diagram of a Y phase variation compensation section in the circuit in FIG. 2.

Referring to FIG. 4, there is shown a block diagram of the Y phase variation compensation section 11 in the circuit in FIG. 2. As shown in this figure, the Y phase variation compensation section 11 includes a 4-bit shifter 161 for inputting the macro slice address signal MSA of 6 bits and outputting a 10-bit signal, and a complement operation unit/shifter 162 for taking a 2's complement of the motion vector Y signal MVY for 5 bits and increasing a MSB of the 2's complement-operated signal to output a 10-bit signal.

Figure 5:
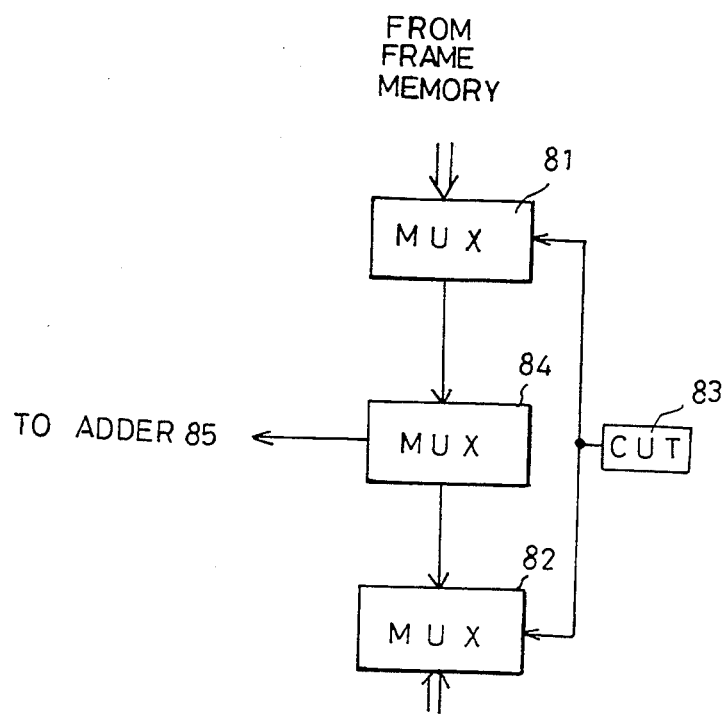
FIG. 5 is a block diagram of a read select controller in the circuit in FIG. 2.

Referring to FIG. 5, there is shown a block diagram of the read select controller 80 in the circuit in FIG. 2. As shown in this drawing, the read select controller 80 includes a multiplexer 81 for 4:1-multiplexing the four output signals from the frame memory section 70, a multiplexer 82 for 4:1-multiplexing the four output signals from the frame memory section 75, a multiplexer select controller 83 for selecting one of the multiplexers 81 and 82, and a pass multiplexer 84 for passing the output from one of the multiplexers 81 and 82 selected by the multiplexer select controller 83 to the adder 85.

Figure 6:
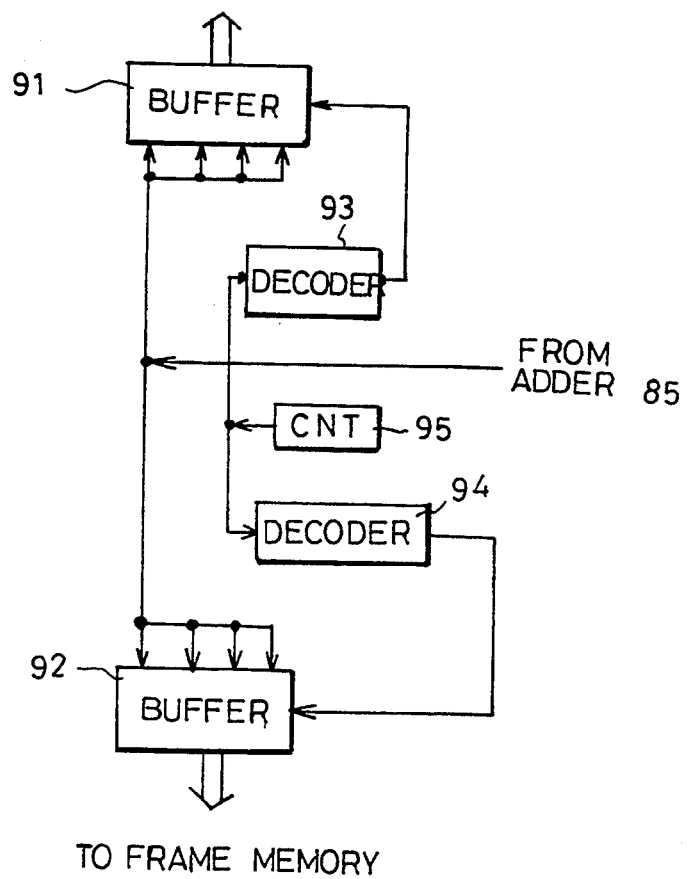
FIG. 6 is a block diagram of a data write controller in the circuit in FIG. 2.

Referring to FIG. 6, there is shown a block diagram of the data write controller 90 in the circuit in FIG. 2. As shown in this drawing, the data write controller 90 includes buffers 91 and 92, each for temporarily storing the video data from the adder 85 and then outputting the stored video data to a corresponding one of the frame memory sections 70 and 75, decoders 93 and 94, each for controlling a corresponding one of the buffers 91 and 92 such that the corresponding buffer outputs the stored video data to the corresponding frame memory section, and a decoder controller 95 for selecting one of the decoders 93 and 94.

Figure 7:
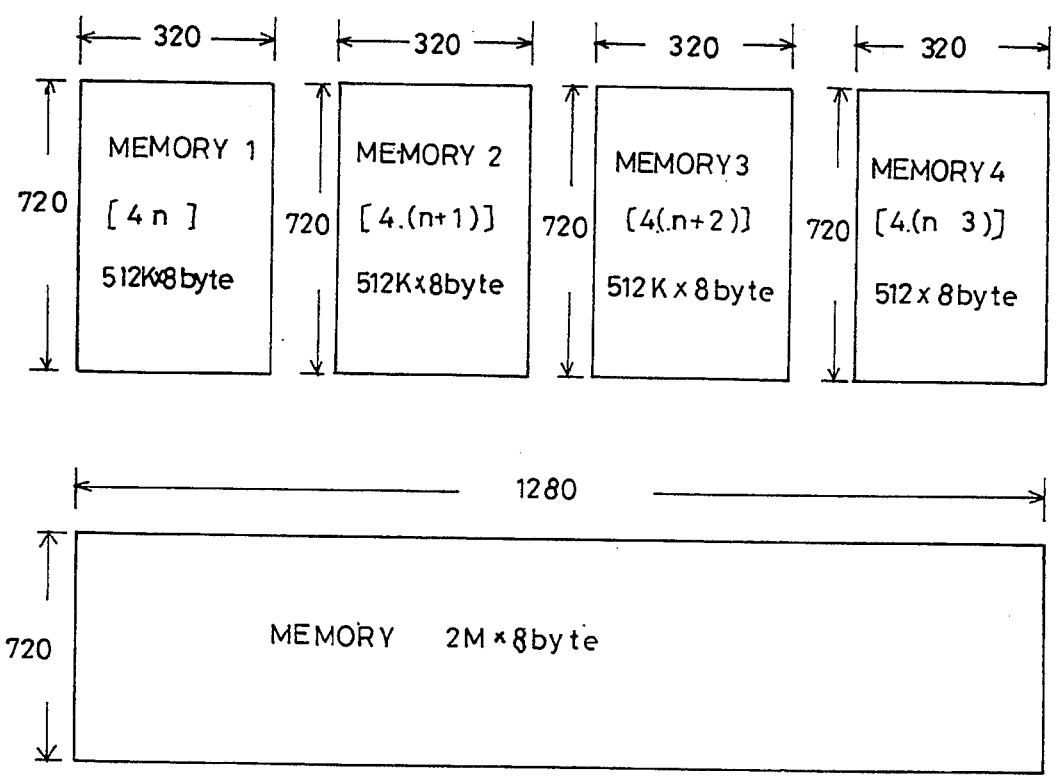
FIG. 7 is a view illustrating a configuration of a four-phase frame memory section in the circuit in FIG. 2.

Referring to FIG. 7, there is shown a configuration of each of the frame memory sections 70 and 75 in the circuit in FIG. 2. As shown in this figure, each of the frame memory sections 70 and 75 is a four-phase frame memory section having four parallel 512K×8-byte memories.

The operation of the video motion compensation circuit with the above-mentioned construction in accordance with the present invention will hereinafter be described in detail.

First, as shown in FIG. 2, the macro slice address signal MSA and the motion vector Y signal MVY are applied to the Y, phase variation compensation section 11, which compensates for the variation in the phase of the motion vector Y signal MVY. The resultant two output signals from the Y phase variation compensation section 11 are added in the 10-bit adder 13 and then latched in the latch circuit 14 for synchronization of the read addressed data from the frame memory sections 70 and 75. Then, the output signal from the latch circuit 14 is applied to the 15 MHz/4 clock counter 10.

The macro block address signal MBA and the motion vector X signal MVX are applied to the X phase variation compensation section 15, which compensates for the variation in the phase of the motion vector X signal MVX according to the construction of the four-phase frame memory sections 70 and 75. The resultant four sets of two output signals from the X phase variation compensation section 15 are added in four adders of the 9-bit adder section 20 and then latched in the fourth latch circuits of the latch circuit section 25, respectively, for synchronization of the read addressed data from the frame memory sections 70 and 75. Then, the output signals from the latch circuit section 25 are applied to the four 15 MHz clock counters of the clock counter section 30, respectively.

Also, the macro slice address signal MSA and the macro block address signal MBA are latched in the latch circuits 35 and 40, respectively, for synchronization of the write addressed data into the frame memory sections 70 and 75. Then, the output signals from the latch circuits 35 and 40 are applied to the 15 MHz/4 and 15 MHz clock counters 45 and 50, respectively. The FIFO memory 55 inputs the output signals from the counters 45 and 50 and outputs a signal delayed by a clock difference between the read and write operations of the frame memory sections 70 and 75.

The output signal from the counter 10, each output signal from the 15 MHz clock counter section 30 and the output signal from the FIFO memory 55 are 2:1-multiplexed by the multiplexer sections 60 and 65, respectively, for variation of the read/write addresses to the frame memory sections 70 and 75.

In the read select controller 80, as shown in FIG. 5, the multiplexer select controller 83 determines the multiplexing order by operating a 2-bit counter according to the low order 2 bits MVX0 and MVX1 of the motion vector X signal MVX. A selected one of the multiplexers 81 and 82 4:1-multiplexes the four output signals of 8-bit data from the frame memory section 70 or 75 under the control of the multiplexer select controller 83.

The output data from the multiplexer 81 or 82 is added to the decoded reproduction video data IT in the adder 85, which outputs the resultant phase-compensated video data.

The output data from the adder 85 is placed on a data bus to one of the frame memory sections 70 and 75 to be written under the control of the data write controller 90, as shown in FIG. 6. In the data write controller 90, the enabling order of the decoders 93 and 94 is determined under the control of the decoder controller 95 depending on the low order 2 bits MVX0 and MVX1 of the motion vector X signal MVX. The enabled decoder 93 or 94 demultiplexes the video data stored in the corresponding buffer 91 or 92 at 15 MHz and writes the demultiplexed video data through the corresponding buffer 91 or 92 to the corresponding addressed frame memory section 70 or 75.

On the other hand, in accordance with the present invention, the memory is mapped being divided into a high order address group and a low order address group corresponding to the X and Y axes for the purpose of efficiently addressing the memory, since the video motion is generated in two dimensions which can be expressed as the motion vector X signal and the motion vector Y signal. For the process of the video data, the basic block is processed in the unit of a macro block (16×6 pixels) and one frame is divided into 80 equal parts in the X axis direction and 45 equal parts in the Y axis direction, the 80 equal parts in the X axis direction being addressed by the macro block address and the 45 equal parts in the Y axis direction being addressed by the macro slide address.

Also according to the present invention, for the purpose of reproducing an accurate video, the compensation for the video motion is performed by finding out the most analogous block from a fixed search area to obtain the motion vector value and moving the position of the video by an amount of the video motion or the motion vector value.

Although a 1M-byte memory could store 1280×720 pixels video data of one frame of a HDTV according to the prior art, there is provided the four-phase frame memory section having the four parallel 512K×8-byte memories to reduce the processing speed to ¼ of that in the prior art in accordance with the present invention, as shown in FIG. 7. With this memory configuration, 2M-byte video data of one frame is stored and addressed, being divided in the X and Y axes. Here, the first memory is allotted with a value of 4×n, the second memory is allotted with a value of 4×(n+1), the third memory is allotted with a value of 4×(n+2) and the fourth memory is allotted with a value of 4×(n+3), where n is any one of 0–79 corresponding to the macro block address MBA.

Because the motion vector value is obtained in the unit of macro block (16×16 blocks), the addressed location of each frame memory to be read is simply (MSA×16)+MVY in the Y axis, whereas (MBA×4)+MVX in the X axis since the video data is divided into four phases in the X axis. Actual X axis position values of the first to fourth phase memories are the same when the motion vector X signal MVX is a multiple of 4. When the motion vector X signal MVX is a multiple of (4n+1), the same block value can be read by adding 1 to a X axis position value of the first phase memory. In this case, the order of phases will be reversed later. In the case where the motion vector X signal MVX is a multiple of (4n+2), the actual X axis position values are obtained by adding 1 to the X axis position values of the first and second phase memories respectively. In the case where the motion vector X signal MVX is a multiple of (4n+3), the actual X axis position values are obtained by adding 1 to the X axis position values of the first, second and third phase memories respectively. In this case, a priority is given to the memory corresponding to the phase of the motion vector X signal MVX. These are performed under the control of the X phase variation compensation section 15 depending on the low order 2 bits MVX0 and MVX1 of the motion vector X signal MVX, as shown in FIG. 3.

In FIG. 3, multiplying the macro block address signal MBA by 4 is solved by shifting the macro block address signal MBA of 7 bits by 2 bits. Here, the LSB of the macro block address signal MBA is always low. For this reason, a X axis read start position of the video data from each frame memory is obtained by using the low state of the LSB of the macro block address signal MBA. Namely, the X axis read start position of the video data from each frame memory is obtained by previously adding 1 to the LSB of the macro block address signal MBA by logically combining the four phases of the low order 2 bits MVX0 and MVX1 of the motion vector X signal MVX of 5 bits, and adding the resultant value to the motion vector X signal MVX. In this case, the motion vector X signal MVX is the 2's complement and is made of 9 bits by increasing the MSB thereof. As a result, a subtraction operation is made possible in disregard of a carry even in the case where the motion vector X signal MVX is a negative number. When the motion vector X signal MVX is the negative number, the operation is performed with a change in the phase in consideration of the low order bits of the 2's complement since 1 is added to a LSB of the 2's complement. Therefore, it can be seen from the negative number of the motion vector X signal MVX that the operation can be applied even to the phase inverted case.

Also, as shown in FIG. 4, a Y axis read start position of the video data from each frame memory is obtained by shifting the macro slice address signal MSA of 6 bits by 4 bits instead of multiplying the macro slice address signal MSA by 16, expanding the motion vector Y signal MVY of 5 bits to 10 bits by increasing the MSB thereof and adding the resultant values.

Figure 8:
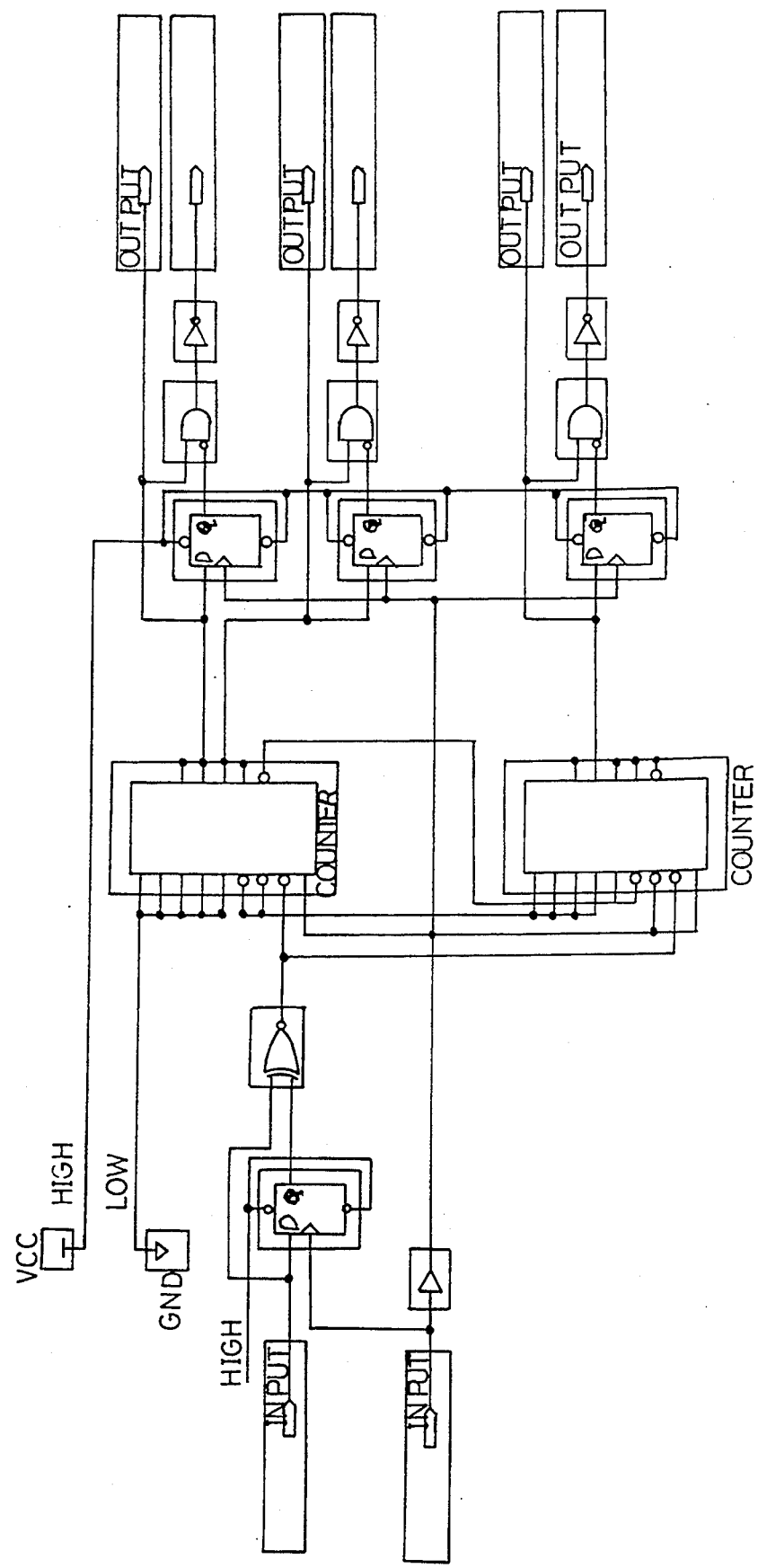
FIG. 8 is a functional block diagram of a system clock generator in the circuit in FIG. 2.

FIG. 8 is a functional block diagram of the system clock generator 100 in the circuit in FIG. 2. The system clock generator 100 generates the system clock using counters to increase the read start position value of the video data on the basis of a predetermined rule after calculation of the rear start position value as mentioned above. The system clock from the system clock generator 100 is delayed by about five of the 15 MHz clocks and then synchronized with the 15 MHz clock to increase the addresses of the X and Y axes. Also, the system clock has a fixed phase based on a frame synchronous signal to alternately select the frame memory section to be read and the frame memory section to be written. The synchronization of the system clock with the 15 MHz clock is performed by latch circuits.

As apparent from the above description, according to the present invention, the two-dimensional, four-phase frame memory configuration can reduce the system clock to ¼ thereof, resulting in a convenience in implementing the system hardware and a stability in the system. Also, the partition of the frame memories makes it possible to real time-process the video data. Moreover, the compensation for the video motion is performed according to the X axis macro block address signal and the Y axis macro slice address signal so that the video data can be compensated for by the detected amount of video motion for accurate reproduction of the video signal.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A video motion compensation circuit comprising:
Y phase variation compensation means for inputting a macro slice address signal and a motion vector Y signal and compensating for a variation in a phase of the motion vector Y signal;
first adding means for adding two output signals from said Y phase variation compensation means;
first latch means for latching an output signal from said first adding means;
first counting means for counting an output signal from said first latch means;
X phase variation compensation means for inputting a macro block address signal and a motion vector X signal and compensating for a variation in a phase of the motion vector X signal;
second adding means having a plurality of adders for adding a plurality of sets of two output signals from said X phase variation compensation means respectively in the unit of set;
second latch means for latching a plurality of output signals from said second adding means respectively;
second counting means for counting a plurality of output signals from said second latch means respectively;
third latch means for latching the macro slice address signal;
third counting means for counting an output signal from said third latch means;
fourth latch means for latching the macro block address signal;
fourth counting means for counting an output signal from said fourth latch means;
storage means for storing output signals from said third and fourth counting means;
first and second multiplexing means, each having a first 2:1 multiplexer for 2:1-multiplexing output signals from said first counting means and said storage means and a second 2:1 multiplexer for 2:1-multiplexing each of a plurality of output signals from said second counting means and the output signal from said storage means;
first frame memory means for storing a plurality of output signals from said first multiplexing means;
second frame memory means for storing a plurality of output signals from said second multiplexing means;
read select control means for selecting one of said first and second frame memory means, inputting a plurality of output signals from the selected frame memory means and providing one output signal;
third adding means for adding the output signal from said read select control means to decoded reproduction video data and outputting the resultant phase-compensated video data;

data write control means for selecting one of said first and second frame memory means and writing the phase-compensated video data from said third adding means into the selected frame memory means; and system clock generating means for generating a system clock pulse.

2. A video motion compensation circuit as set forth in claim 1, wherein each of said first and third counting means is a 15 MHz/4 clock counter for counting a corresponding one of the output signals from said first and third latch means at a clock of 15 MHz/4, said second latch means has four latch circuits, each for latching a corresponding one of the plurality of output signals from said second adding means, said second counting means has four 15 MHz clock counters, each for counting a corresponding one of the output signals from the four latch circuits of said second latch means at a clock of 15 MHz and said fourth counting means is a 15 MHz clock counter for counting the output signal from said fourth latch means at a clock of 15 MHz.

3. A video motion compensation circuit as set forth in claim 1, wherein said X phase variation compensation means includes four logic circuits, each logic circuit having:

a 2-bit shifter for inputting the macro block address signal of 7 bits and outputting a 9-bit signal as one of the two output signals to a corresponding one of the adders of said second adding means;

a logic adder for logically combining low order 2 bits of the motion vector X signal of 5 bits to previously add 1 to a least significant bit of the macro block address signal; and a complement operation unit/shifter for taking a 2's complement of the motion vector X signal of 5 bits and increasing a most significant bit of the 2's complement-operated signal to output a 9-bit signal as the other of the two output signals to the corresponding one of the adders of said second adding means.

4. A video motion compensation circuit as set forth in claim 1, wherein said Y phase variation compensation means includes:

a 4-bit shifter for inputting the macro slice address signal of 6 bits and outputting a 10-bit signal as one of the two output signals to said first adding means; and a complement operation unit/shifter for taking a 2's complement of the motion vector Y signal of 5 bits and increasing a most significant bit of the 2's complement-operated signal to output a 10-bit signal as the other of the two output signals to said first adding means.

5. A video motion compensation circuit as set forth in claim 1, wherein said read select control means includes:

a third multiplexer for 4:1-multiplexing the plurality of output signals from said first frame memory means;

a fourth multiplexer for 4:1-multiplexing the plurality of output signals from said second frame memory means;

a multiplexer select controller for selecting one of said third and fourth multiplexers; and a fifth multiplexer for passing the output from one of said third and fourth multiplexers selected by said multiplexer select controller to said third adding means.

6. A video motion compensation circuit as set forth in claim 1, wherein said data write control means includes:

first and second buffers, each for temporarily storing the video data from said third adding means and then outputting the stored video data to a corresponding one of said first and second frame memory means;

first and second decoders, each for controlling a corresponding one of said first and second buffers such that the corresponding buffer outputs the stored video data to the corresponding frame memory means; and a decoder controller for selecting one of said first and second decoders.

7. A video motion compensation circuit as set forth in claim 1, wherein each of said first and second frame memory means is a four-phase frame memory having four parallel 512K×8-byte.

8. A video motion compensation circuit as set forth in claim 1, wherein said system clock generating means generates the system clock to increase read start position values of the video data from said first and second frame memory means on the basis of a predetermined rule, said system clock being delayed by about five of 15 MHz clocks and then synchronized with the 15 MHz clock to increase addresses of X and Y axes, said system clock having a fixed phase based on a frame synchronous signal to alternately select the frame memory means to be read and the frame memory means to be written.

* * * * *